US011947294B2

(12) United States Patent
Matsumoto et al.

(10) Patent No.: US 11,947,294 B2
(45) Date of Patent: Apr. 2, 2024

(54) FIXING DEVICE AND IMAGE FORMING APPARATUS

(71) Applicant: FUJIFILM Business Innovation Corp., Tokyo (JP)

(72) Inventors: Mitsuhiro Matsumoto, Kanagawa (JP); Norio Ogawahara, Kanagawa (JP); Yoshiki Shimodaira, Kanagawa (JP); Masato Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/550,858

(22) Filed: Dec. 14, 2021

(65) Prior Publication Data

US 2023/0067716 A1 Mar. 2, 2023

(30) Foreign Application Priority Data

Aug. 25, 2021 (JP) ................................ 2021-137605

(51) Int. Cl.
*G03G 15/20* (2006.01)

(52) U.S. Cl.
CPC ..... *G03G 15/2057* (2013.01); *G03G 15/2039* (2013.01); *G03G 15/2064* (2013.01)

(58) Field of Classification Search
None
See application file for complete search history.

(56) References Cited

U.S. PATENT DOCUMENTS 6,144,832 A * 11/2000 Nimura ................ G03G 15/206 271/119
2006/0291920 A1* 12/2006 Hong ................. G03G 15/2064 399/328
2007/0212093 A1* 9/2007 Maeda ............... G03G 15/2039 399/70
2008/0166160 A1* 7/2008 Fukaya .............. G03G 15/2053 399/328
2012/0081688 A1* 4/2012 Yamaji ............... G03G 15/6585 355/77
2012/0328308 A1* 12/2012 Takada ............... G03G 15/2039 399/33
2013/0209149 A1* 8/2013 Suzuki ............... G03G 15/2064 264/271.1
2014/0023389 A1* 1/2014 Ono ................... G03G 15/2017 399/69
2016/0274513 A1* 9/2016 Yamaguchi ........ G03G 15/2028
2021/0325803 A1* 10/2021 Yamashita ........... G03G 15/235
2022/0107594 A1* 4/2022 Chun ................... G03G 15/206

FOREIGN PATENT DOCUMENTS

JP 08166735 A * 6/1996 ......... G03G 15/2053
JP H11-24465 A 1/1999
JP 2000508280 A * 7/2000 ............. G03G 15/20
JP 3545834 B2 * 7/2004 ......... G03G 15/2053
JP 2007272032 A * 10/2007 ......... G03G 15/2032
JP 2010271454 A * 12/2010 ......... G03G 15/2039
WO WO-2020256762 A1 * 12/2020 ......... G03G 15/2053

* cited by examiner

*Primary Examiner* — Sevan A Aydin
(74) *Attorney, Agent, or Firm* — Oliff PLC

(57) ABSTRACT

A fixing device includes: a first roller on which an elastic layer is formed; and a second roller that forms a clamping portion at which a recording medium is clamped between the first roller and the second roller, a groove extending in an axial direction being formed in an outer peripheral surface of the second roller, and the second roller not including an elastic layer.

13 Claims, 9 Drawing Sheets

FIXING DEVICE AND IMAGE FORMING APPARATUS

CROSS-REFERENCE TO RELATED APPLICATIONS

This application is based on and claims priority under 35 USC 119 from Japanese Patent Application No. 2021-137605 filed Aug. 25, 2021.

BACKGROUND

(i) Technical Field

The present disclosure relates to a fixing device and an image forming apparatus.

(ii) Related Art

Japanese Unexamined Patent Application Publication No. 11-024465 describes a fixing device composed of a fixing roller, a pressure member including a plurality of support rollers and an endless belt provided in a tense state on the support rollers, and an external heating roller including a heating source, in which the fixing roller includes, on its surface, a heat conduction layer with a thermal conductivity of $1.7\times10^{-3}$ Cal/cm·sec·® C. or higher, two of the support rollers are pressure rollers that press the belt onto the surface of the fixing roller to form a fixing nip part, and the external heating roller is provided to be moved in a following manner in contact with the surface of the fixing roller.

SUMMARY

The fixing device fixes an image to a recording medium by clamping and transporting the recording medium, on which the image has been formed, between a heating roller and a pressurizing roller that are rotated. Thus, it is necessary to form a holding portion (nip part), at which the recording medium is clamped by deforming an elastic layer, between the heating roller and the pressurizing roller.

In the case where a grip portion that grips the distal end of the recording medium to transport the recording medium is adopted as a transport unit that transports the recording medium, for example, a groove that extends in the axial direction and that stores the grip portion therein is formed in one of the pressurizing roller and the heating roller. With such a configuration, the holding portion may not be constituted by the pressurizing roller and the heating roller in the groove portion. Therefore, the pressurizing roller and the heating roller are occasionally separated in the groove portion and caused to abut again at a location other than the groove portion. In this event, a location at which the pressurizing roller and the heating roller abut in order to secure as large a region in which the holding portion is formed, that is, a region in which fixing may be performed, as possible repeatedly abuts against an edge of the groove in the roller. This may damage the elastic layer at a portion at which such abutment is repeatedly made, or may degrade the function of the elastic layer.

Aspects of non-limiting embodiments of the present disclosure relate to suppressing damage to an elastic layer or a degradation in the function of the elastic layer compared to the case where a roller in which a groove extending in the axial direction is formed includes an elastic layer.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fixing device including: a first roller on which an elastic layer is formed; and a second roller that forms a clamping portion at which a recording medium is clamped between the first roller and the second roller, a groove extending in an axial direction being formed in an outer peripheral surface of the second roller, and the second roller not including an elastic layer.

BRIEF DESCRIPTION OF THE DRAWINGS

An exemplary embodiment of the present disclosure will be described in detail based on the following figures, wherein.

DETAILED DESCRIPTION

Figure 1:
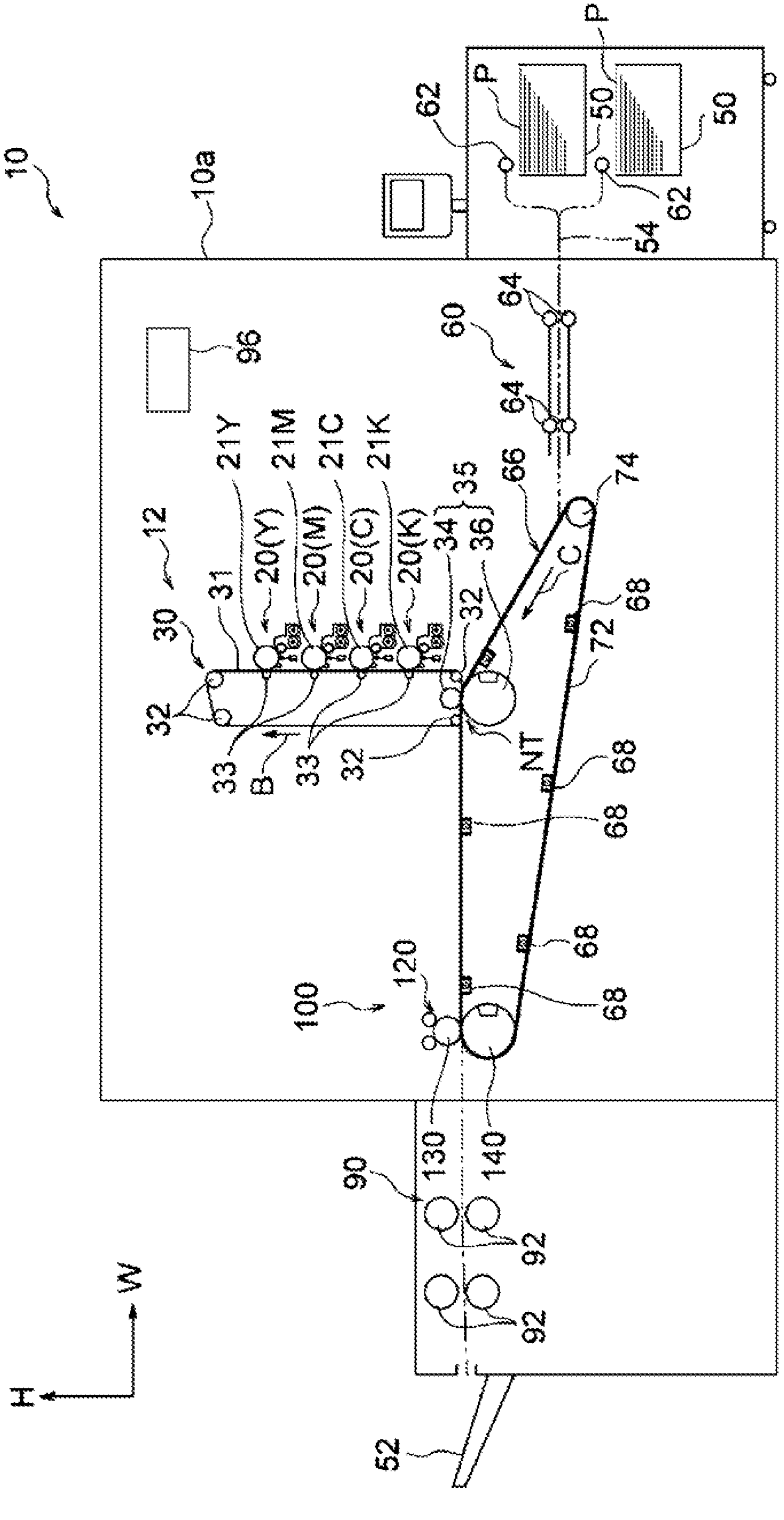
FIG. 1 illustrates a schematic configuration of an image forming apparatus according to an exemplary embodiment of the present disclosure.

A fixing device and an image forming apparatus according to an exemplary embodiment of the present disclosure will be described with reference to FIGS. 1 to 9. In the drawings, the arrow H indicates the apparatus height direction (vertical direction), the arrow W indicates an apparatus width direction (horizontal direction), and the arrow D indicates an apparatus depth direction (horizontal direction). The apparatus width direction and the apparatus depth direction are orthogonal to each other.

(Image Forming Apparatus 10)

As illustrated in FIG. 1, an image forming apparatus 10 is an image forming apparatus of an electrophotographic system that forms a toner image on a sheet member P as an example of the recording medium. The image forming apparatus 10 includes storage sections 50, an ejection section 52, an image forming section 12, a transport mechanism 60, a fixing section 100, a cooling section 90, and a control section 96.

(Storage Sections 50 and Ejection Section 52)

As illustrated in FIG. 1, the storage sections 50 are disposed at a portion of an apparatus body 10*a* on one side in the apparatus width direction, and are drawable from the apparatus body 10*a*. Two storage sections 50 are provided in line in the apparatus height direction. Sheet members P of different sizes are stored in the storage sections 50.

The ejection section 52 is disposed at a portion of the apparatus body 10*a* on the other side in the apparatus width direction. Sheet members P on which a toner image has been formed are ejected to the ejection section 52.

(Cooling Section 90)

As illustrated in FIG. 1, the cooling section 90 is disposed on one side of the ejection section 52 in the apparatus width direction, and includes a pair of cooling rollers 92 arranged side by side in the apparatus width direction.

The cooling rollers 92 are constituted as cylindrical rollers formed from metal etc. The cooling rollers 92 allow air to flow through the inside thereof.

In such a configuration, the cooling section 90 cools the sheet member P that has been heated by the fixing section 100 through heat exchange with air flowing through the cooling section 90. The cooling section 90 ejects the cooled sheet member P to the ejection section 52.

(Image Forming Section 12)

As illustrated in FIG. 1, the image forming section 12 is disposed between the storage sections 50 and the cooling section 90 in the apparatus width direction. The image forming section 12 includes toner image forming sections 20 that form a toner image, and a transfer device 30 that transfers the toner image formed by the toner image forming sections 20 to the sheet member P.

[Toner Image Forming Section 20]

A plurality of toner image forming sections 20 are provided to form toner images in respective colors. The image forming apparatus 10 includes toner image forming sections 20 for four colors, namely yellow (Y), magenta (M), cyan (C), and black (K).

The toner image forming sections 20 for the four colors are disposed in line from the upper side toward the lower side in the circulation direction (the direction of the arrow B in the drawing) of a transfer belt 31 (to be discussed in detail later) in the order of yellow (Y), magenta (M), cyan (C), and black (K) from the upstream side.

Figure 2:
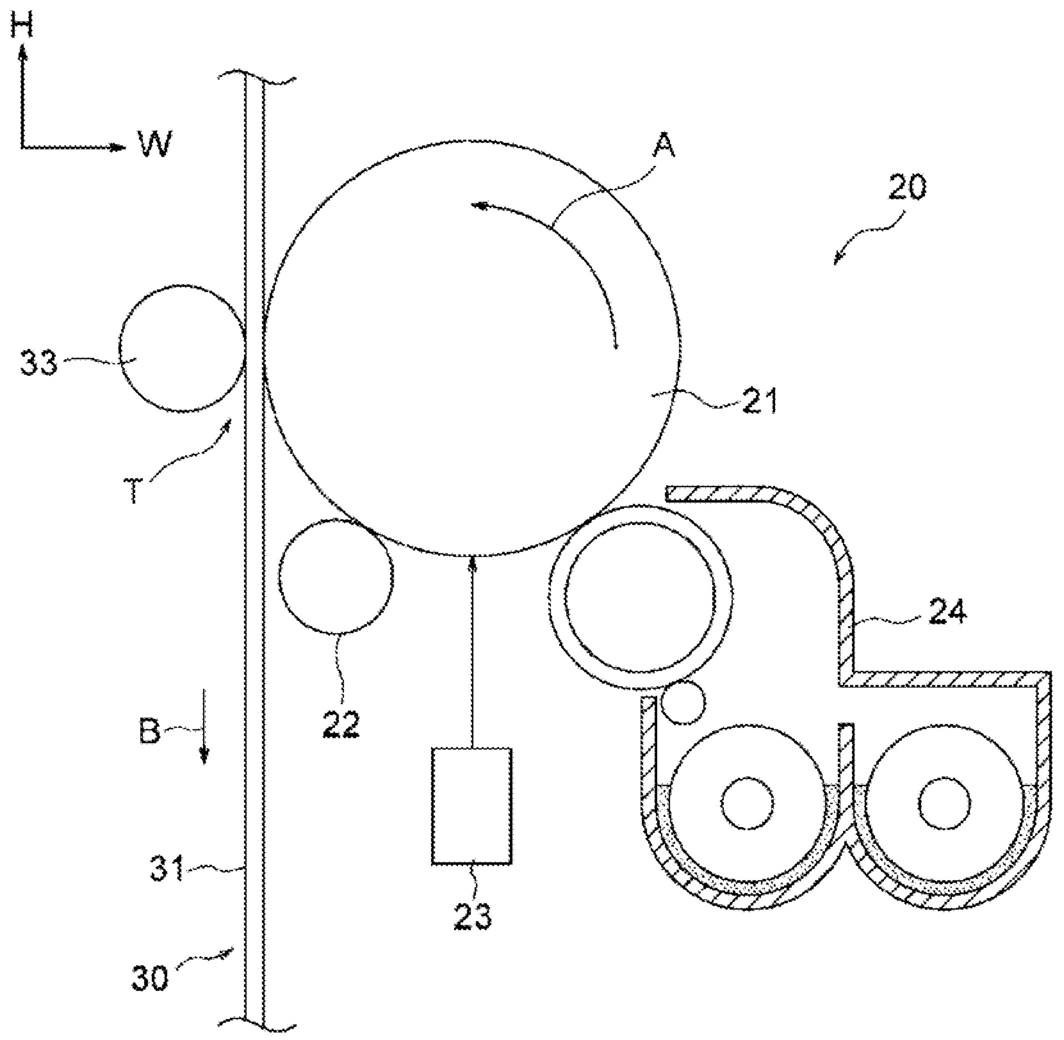
FIG. 2 illustrates the configuration of a toner image forming section provided in the image forming apparatus according to the exemplary embodiment of the present disclosure.

The toner image forming sections 20 for the respective colors are basically formed in the same manner except for the toners to be used. Specifically, as illustrated in FIG. 2, the toner image forming section 20 for each color includes an image holding member 21 (photosensitive element) that is rotated in the direction of the arrow A in the drawing, and a charging unit 22 that charges the image holding member 21. The toner image forming section 20 for each color further includes an exposure device 23 that exposes the image holding member 21 charged by the charging unit 22 to light to form an electrostatic latent image on the image holding member 21, and a developing device 24 that develops the electrostatic latent image formed on the image holding member 21 by the exposure device 23 to form a toner image.

In such a configuration, the toner image forming section 20 for each color forms a toner image in each color using a toner in each color.

[Transfer Device 30]

As illustrated in FIG. 1, the transfer device 30 includes a transfer belt 31 as an intermediate transfer body, first transfer rollers 33, and a transfer section 35.

Transfer Belt 31

As illustrated in FIG. 1, the transfer belt 31 has an endless shape, and is wound around a plurality of rollers 32 and disposed so as to extend in the apparatus height direction, contacting the image holding members 21 for the respective colors. The transfer belt 31 is circulated in the direction of the arrow B in the drawing as at least one of the plurality of rollers 32 is rotationally driven.

First Transfer Rollers 33

As illustrated in FIG. 1, the first transfer rollers 33 are disposed on the opposite side of the transfer belt 31 from the image holding members 21 for the respective colors. As illustrated in FIG. 2, the first transfer roller 33 transfers the toner image formed on the image holding member 21 to the transfer belt 31 at a first transfer position T between the image holding member 21 and the first transfer roller 33.

Transfer Section 35

As illustrated in FIG. 1, the transfer section 35 is disposed at a lower portion of the transfer belt 31, and includes a second transfer roller 34 and a counter roller 36. The counter roller 36 is disposed on the opposite side of the transfer belt 31 so as to face the second transfer roller 34 in the apparatus height direction.

In such a configuration, the first transfer roller 33 transfers the toner image formed on the image holding member 21 to the transfer belt 31 at the first transfer position T using an electrostatic force generated by the first transfer roller 33. Further, the transfer belt 31 is circulated to transport the toner image that has been transferred through the first transfer to a second transfer position NT. In addition, the transfer section 35 transfers the toner image transferred to the transfer belt 31 to the sheet member P passing through the second transfer position NT using an electrostatic force generated by the second transfer roller 34.

(Transport Mechanism 60)

As illustrated in FIG. 1, the transport mechanism 60 is disposed on the lower side of the image forming section 12 in the apparatus height direction. The transport mechanism 60 includes feeding rollers 62, transport rollers 64, and a chain gripper 66.

[Feeding Rollers 62 and Transport Rollers 64]

The feeding rollers 62 are disposed in contact with the distal end portion of the sheet member P stored in each storage section 50 so as to feed the sheet member P stored in the storage section 50. The feeding rollers 62 feed the sheet member P to a transport path 54 through which the sheet member P is to be transported.

A plurality of transport rollers 64 are provided, and disposed side by side in the apparatus width direction downstream of the feeding rollers 62 in the transport direction of the sheet member P. The transport rollers 64 receive the sheet member P fed to the transport path 54 by the feeding rollers 62, and transport the received sheet member P to the chain gripper 66.

[Chain Gripper 66]

Figure 3:
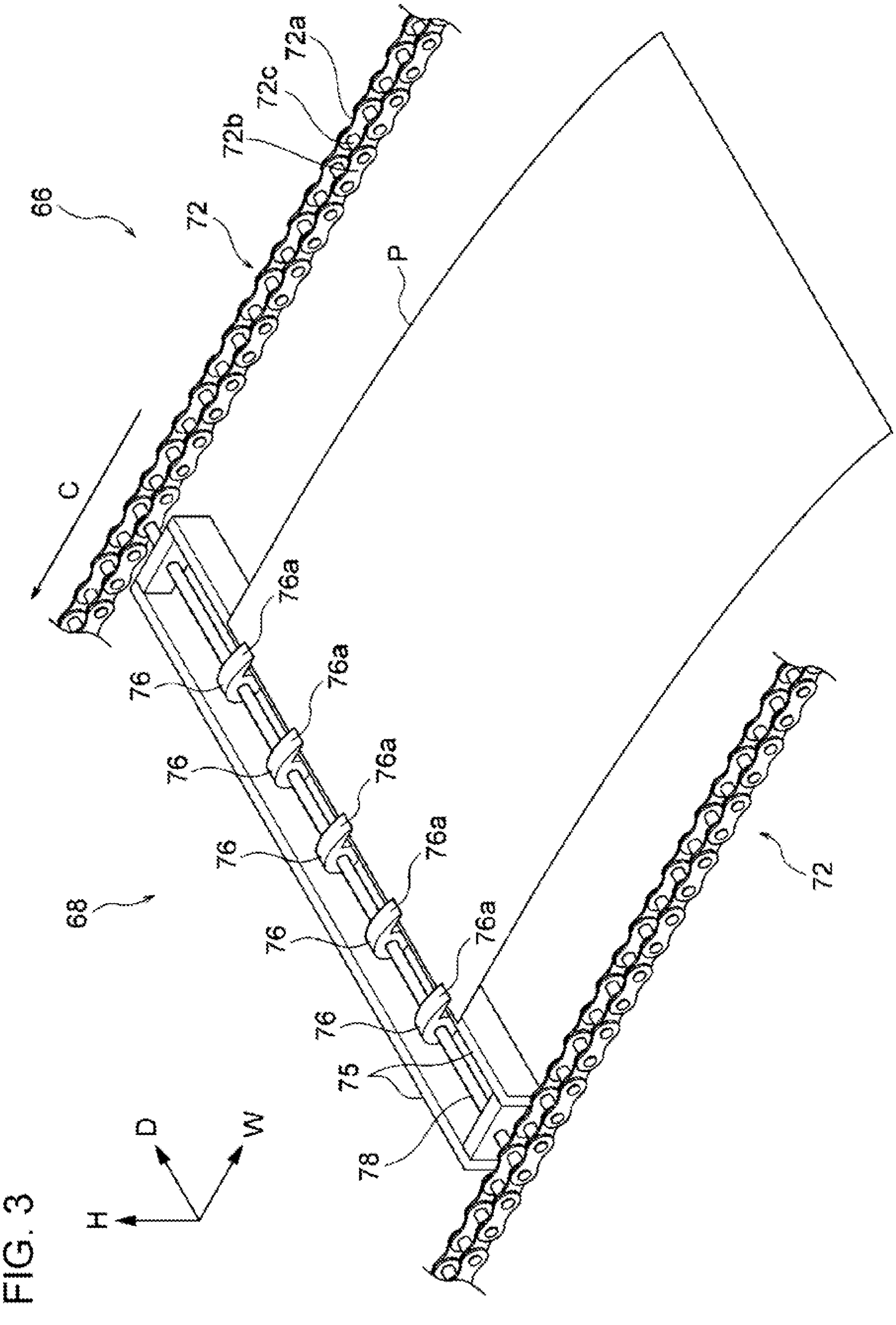
FIG. 3 is a perspective view illustrating a chain gripper provided in the image forming apparatus according to the exemplary embodiment of the present disclosure.
Figure 4:
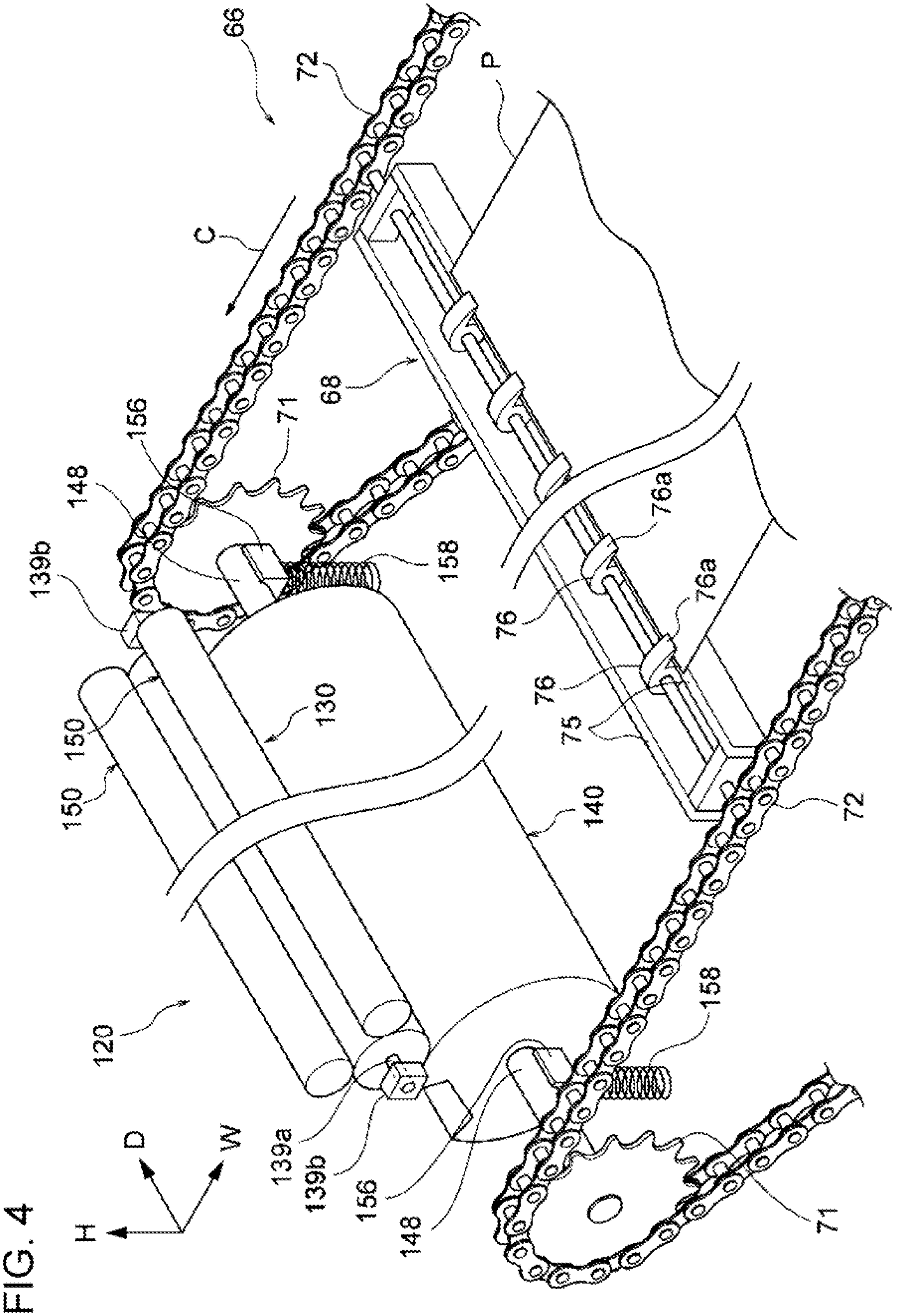
FIG. 4 is a perspective view illustrating a fixing unit etc. provided in the image forming apparatus according to the exemplary embodiment of the present disclosure.

The chain gripper 66 is disposed on the other side of the transport rollers 64 in the apparatus width direction. As illustrated in FIGS. 3 and 4, the chain gripper 66 includes a pair of chains 72 and grip portions 68.

Chains 72

A pair of chains 72 are provided, and disposed as separated from each other in the apparatus depth direction as illustrated in FIG. 3. Further, the chains 72 are formed in an endless shape, and include a plurality of outer plates 72*a* made of metal, a plurality of inner plates 72$b$ made of metal, and pins 72$c$ that couple the outer plates 72$a$ and the inner plates 72$b$ to each other. The pair of chains 72 illustrated in FIG. 1 are wound around a pair of sprockets (not illustrated) disposed on both sides of the counter roller 36, a pair of sprockets 71 (see FIG. 4) disposed on both sides of a pressurizing roller 140 to be discussed later, and a pair of sprockets 74 disposed as spaced from each other in the apparatus depth direction.

Specifically, as illustrated in FIG. 1, the pressurizing roller 140, on both sides of which the sprockets 71 are disposed, is disposed on the other side of the counter roller 36 in the apparatus width direction. Further, the pair of sprockets 74 are disposed on one side of the counter roller 36 in the apparatus width direction, and on the lower side of the counter roller 36 in the apparatus height direction. The pair of chains 72 are wound around such sprockets. The chains 72 are circulated in the direction of the arrow C as any of the pair of sprockets is rotated.

Clamping Portions 68

A plurality of grip portions 68 are provided, and disposed at intervals determined in advance along the circumferential direction of the chains 72 as illustrated in FIG. 1. As illustrated in FIG. 3, the grip portion 68 includes an attachment member 75 that extends in the apparatus depth direction and both end portions of which are attached to the pair of chains 72, a shaft member 78 disposed inside the attachment member 75 to extend in the apparatus depth direction, and grippers 76 as gripping members attached to the shaft member 78.

Figure 7:
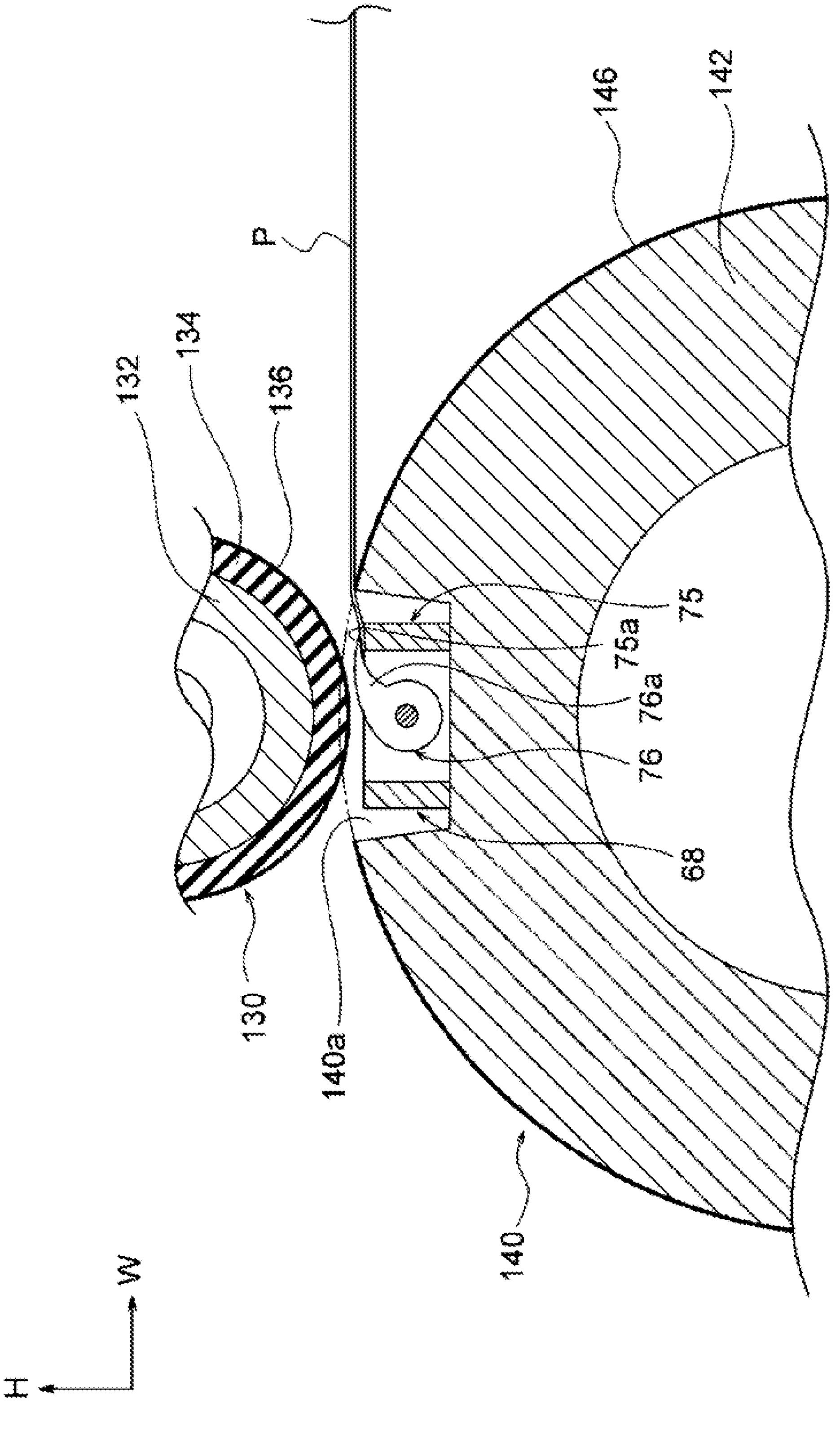
FIG. 7 is an enlarged sectional view illustrating the fixing unit etc. provided in the image forming apparatus according to the exemplary embodiment of the present disclosure.

A plurality of grippers 76 are provided, and attached to the shaft member 78 at intervals determined in advance along the apparatus depth direction. Further, a lug 76$a$ is formed on each of the grippers 76, and a contact portion 75$a$ to be contacted by the lug 76$a$ is formed on the attachment member 75 as illustrated in FIG. 7.

The grippers 76 grip the sheet member P by clamping the distal end portion of the sheet member P between the lugs 76$a$ and the contact portion 75$a$. In this manner, the grippers 76 have a function of gripping the distal end portion of the sheet member P. The grippers 76 are constructed such that the lugs 76$a$ are pushed against the contact portion 75$a$ by springs etc. and the lugs 76$a$ are brought into and out of contact with the contact portion 75$a$ by the action of cams etc., for example.

In such a configuration, the grip portion 68 receives the sheet member P transported by the transport rollers 64 as the pair of chains 72 are circulated, and the grippers 76 of the grip portion 68 grip the distal end portion of the sheet member P. Further, the grip portion 68 transports the sheet member P, the distal end portion of which is gripped by the grippers 76, to the second transfer position NT. Further, the grip portion 68 transports the sheet member P to a fixing unit 120.

(Fixing Section 100)

As illustrated in FIG. 1, the fixing section 100 is disposed downstream of the second transfer position NT in the transport direction of the sheet member P. The fixing section 100 includes a fixing unit 120.

[Fixing Unit 120]

Figure 5:
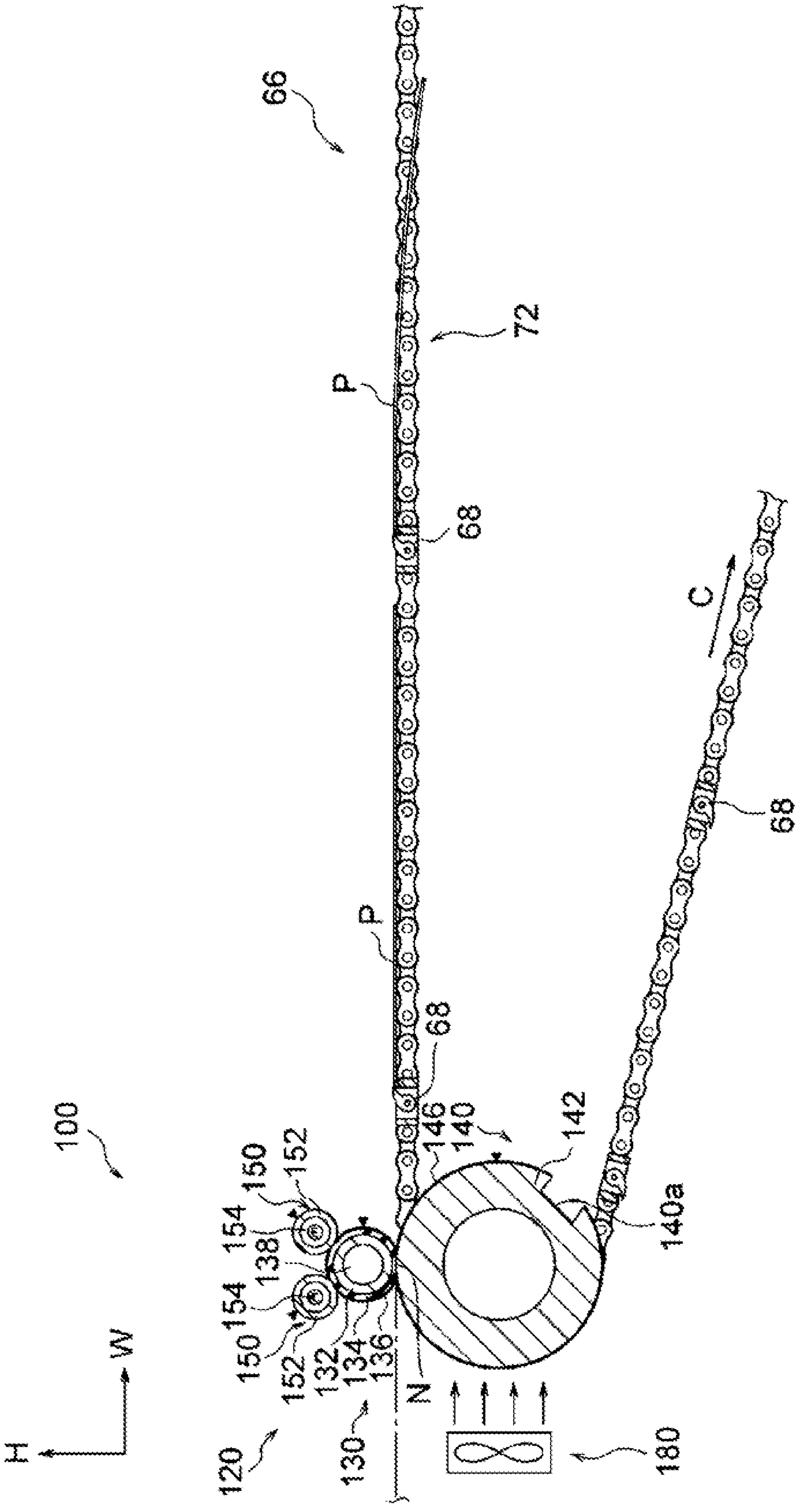
FIG. 5 is a sectional view illustrating the fixing unit etc. provided in the image forming apparatus according to the exemplary embodiment of the present disclosure.

The fixing unit 120 is disposed as illustrated in FIG. 5. The fixing unit 120 heats a toner image by contacting the sheet member P being transported, and fixes the toner image to the sheet member P.

The fixing unit 120 includes a heating roller 130 that heats a toner image by contacting the sheet member P being transported, and a pressurizing roller 140 that pressurizes the sheet member P toward the heating roller 130. The fixing unit 120 further includes external heating rollers 150 rotated in a following manner by the heating roller 130 which is rotated. The fixing unit 120 will be discussed in detail later.

(Function of Image Forming Apparatus 10)

Next, the function of the image forming apparatus 10 will be described.

The feeding rollers 62 illustrated in FIG. 1 feed the sheet member P stored in the storage section 50 to the transport path 54. The plurality of transport rollers 64 receive the sheet member P fed to the transport path 54, and transport and deliver the sheet member P to the grip portion 68 of the chain gripper 66. Consequently, the grip portion 68 transports the sheet member P to the second transfer position NT with the distal end portion of the sheet member P gripped by the grippers 76. The transfer section 35 transfers the toner image transferred to the transfer belt 31 to the sheet member P passing through the second transfer position NT using an electrostatic force.

Further, the grip portion 68 transports the sheet member P to the fixing unit 120. The fixing unit 120 fixes a toner image to the sheet member P.

Further, the grip portion 68 delivers the sheet member P, to which the toner image has been fixed, to the cooling rollers 92 of the cooling section 90. The cooling rollers 92 transport the sheet member P while cooling the sheet member P, and eject the cooled sheet member P to the ejection section 52.

(Construction of Principal Portion)

Next, the fixing unit 120 will be described. The fixing unit 120 is an example of the fixing device.

As illustrated in FIG. 5, the fixing unit 120 includes a heating roller 130 that heats a toner image by contacting the sheet member P being transported, and a pressurizing roller 140 that pressurizes the sheet member P toward the heating roller 130. The fixing unit 120 further includes external heating rollers 150 rotated in a following manner by the heating roller 130, which is rotated, to heat the heating roller 130, and a contact/release mechanism 200 that causes the heating roller 130 to contact and be released from the pressurizing roller 140. The heating roller 130 is an example of the first roller. The pressurizing roller 140 is an example of the second roller.

[Heating Roller 130]

As illustrated in FIG. 5, the heating roller 130 is disposed so as to contact an upward facing surface of the sheet member P being transported, and extends in the apparatus depth direction with the axial direction of the heating roller 130 corresponding to the apparatus depth direction. The heating roller 130 includes a cylindrical base material 132, an elastic layer 134 that covers the entire circumference of the base material 132, and a release layer 136 that covers the entire circumference of the elastic layer 134.

The elastic layer is a layer that is significantly deformable with respect to a force, such as a rubber layer or a resin layer, and the modulus of elasticity of which is low compared to metal. The elastic layer refers to a layer formed from a member, the modulus of elasticity (Young□s modulus) of which at 25° C. is about several MPa to several hundred MPa, and specifically refers to a layer formed from a member with a modulus of elasticity of 1 Mpa to 60 MPa. That is, the elastic layer functions as a deformable layer that is deformable along the outer surface of an object when pressurized by the object. A holding width L1 at a holding portion 160, to be discussed later, is increased as the amount of deformation is increased.

As illustrated in FIG. 4, both end portions of the heating roller 130 in the apparatus depth direction are each provided with a shaft portion 139*a* that extends in the apparatus depth direction, and a support portion 139*b* that supports the shaft portion 139*a*. Consequently, the heating roller 130 is rotatably supported with both end portions of the heating roller 130 supported by the support members 139*b*.

[Pressurizing Roller 140]

As illustrated in FIG. 5, the pressurizing roller 140 is disposed on the opposite side of the support member P being transported from the heating roller 130 so as to contact a downward facing surface of the sheet member P being transported, and extends in the apparatus depth direction with the axial direction of the pressurizing roller 140 corresponding to the apparatus depth direction.

The pressurizing roller 140 includes a cylindrical base material 142, a release layer 146 formed so as to directly cover the base material 142, and a pair of shaft portions 148 (see FIG. 4) formed at both end portions in the apparatus depth direction. In this manner, the pressurizing roller 140 does not include an elastic layer, unlike the heating roller 130.

As illustrated in FIG. 7, a recessed portion 140*a* that extends in the apparatus depth direction is formed in the outer peripheral surface of the pressurizing roller 140. The grip portion 68 which transports the support member P is stored in the recessed portion 140*a* when the support member P passes between the pressurizing roller 140 and the heating roller 130. The recessed portion 140*a* is an example of the groove.

As illustrated in FIG. 4, the pair of shaft portions 148 are formed at both end portions of the pressurizing roller 140. The pair of shaft portions 148 have a small diameter compared to the outer peripheral surface of the release layer 146 of the pressurizing roller 140, and extend in the axial direction.

Further, as illustrated in FIG. 4, the fixing unit 120 includes support members 156 that support the pressurizing roller 140, and biasing members 158 that bias the pressurizing roller 140 toward the heating roller 130 via the support members 156. A pair of support members 156 are provided. The pair of support members 156 are disposed so as to rotatably support the pair of shaft portions 148 of the pressurizing roller 140 from below.

Figure 8:
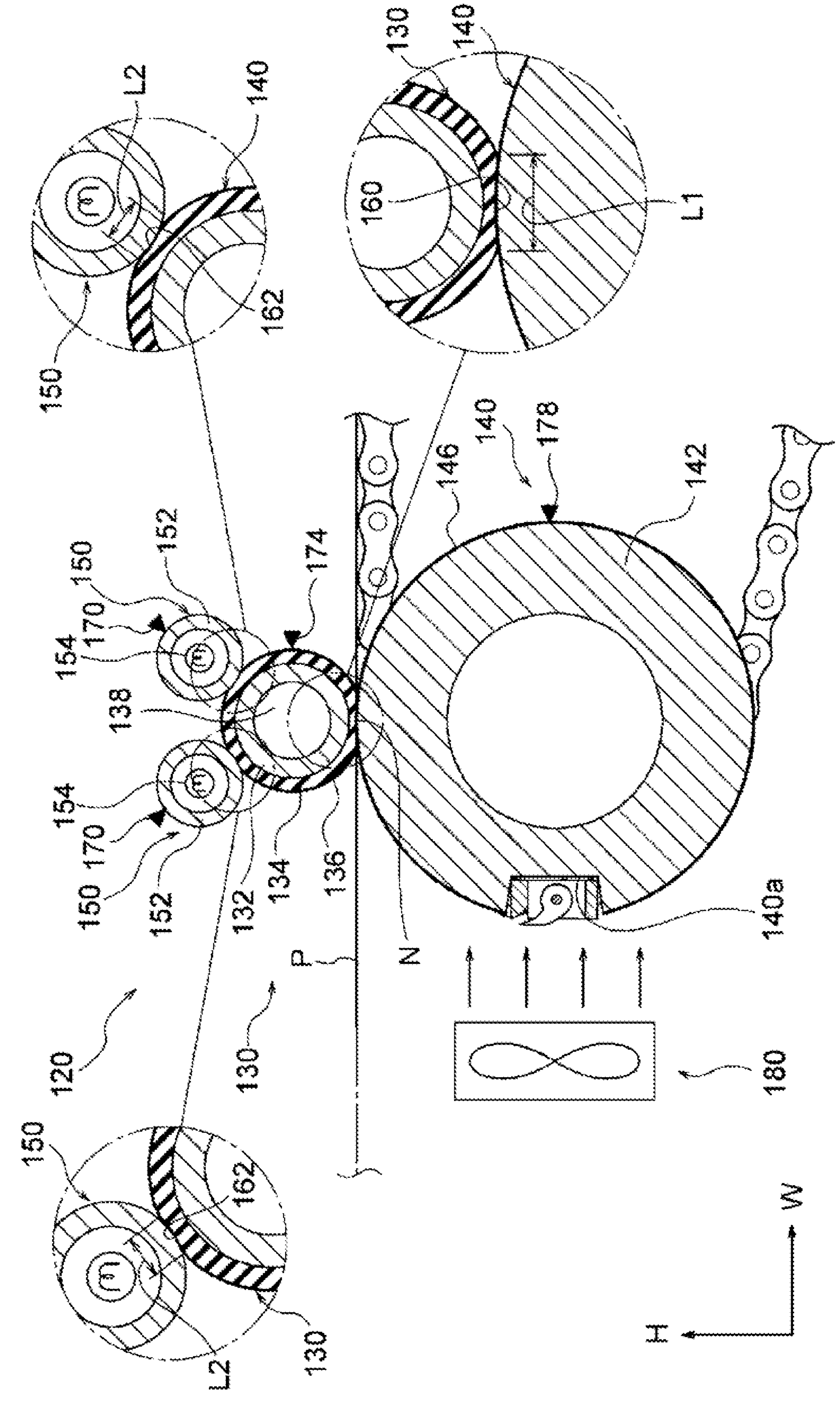
FIG. 8 is a sectional view illustrating the fixing unit etc. provided in the image forming apparatus according to the exemplary embodiment of the present disclosure.

The biasing members 158 are a pair of compression springs disposed on the opposite side of the support members 156 from the shaft portions 148. Consequently, the pressurizing roller 140 pressurizes the sheet member P toward the heating roller 130. With the elastic layer 134 of the heating roller 130 deformed by the pressurizing force of the pressurizing roller 140, a holding portion 160 that clamps the sheet member P being transported is formed between the pressurizing roller 140 and the heating roller 130 as illustrated in FIG. 8. The holding width at the holding portion 160 is defined as L1. The holding portion 160 is an example of the clamping portion. The holding width is an example of the clamping width. The holding width L1 is the length of a portion at which the pressurizing roller 140 and the heating roller 130 contact each other as seen in the axial direction of the heating roller 130.

[Contact/Release Mechanism 200]

Figure 6:
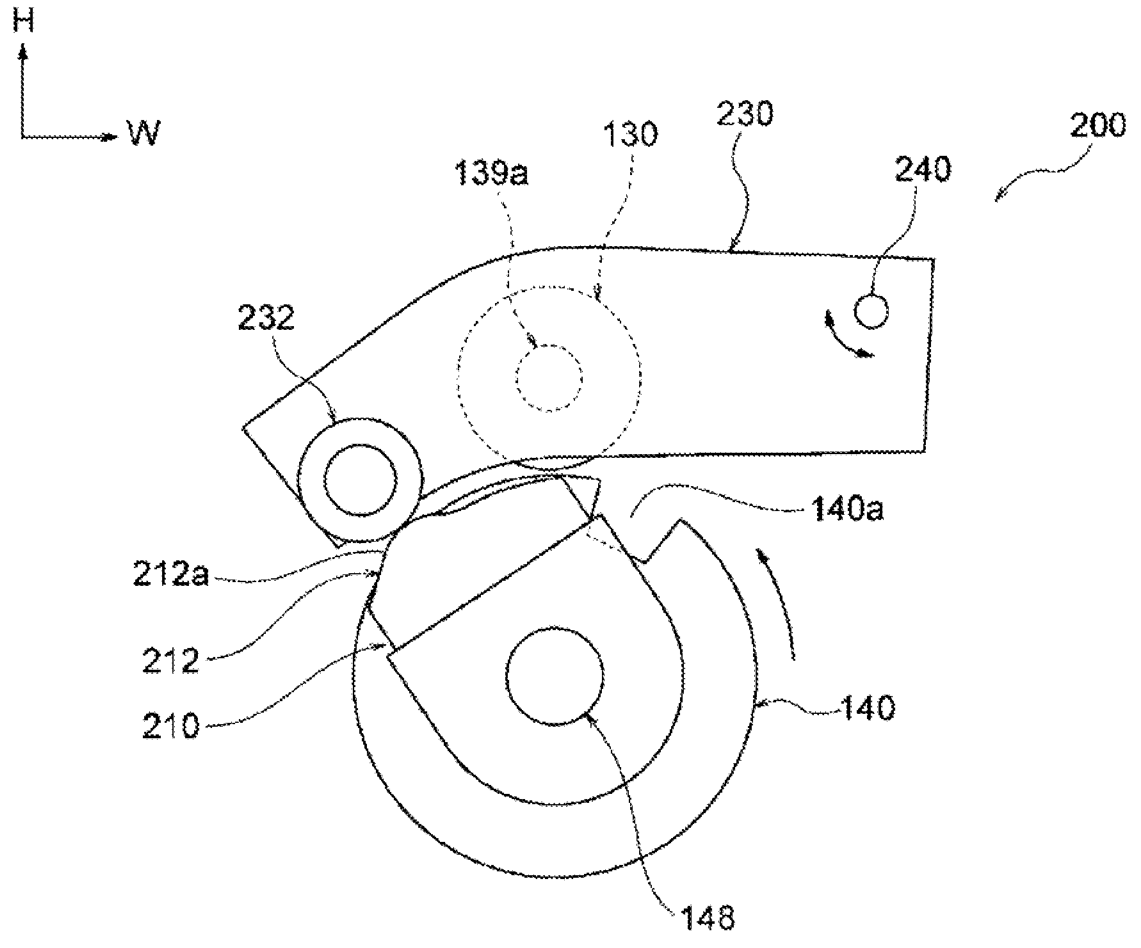
FIG. 6 is a side view illustrating a contact/release mechanism provided in the image forming apparatus according to the exemplary embodiment of the present disclosure.

As illustrated in FIG. 6, the contact/release mechanism 200 is a cam mechanism provided on both sides, in the apparatus depth direction, with respect to the heating roller 130 and the pressurizing roller 140. The contact/release mechanism 200 is configured in the same manner on one side and on the other side in the apparatus depth direction. The configuration of the contact/release mechanism 200 on one side will be described below.

The contact/release mechanism 200 includes a cam member 210 attached to the shaft portion 148 of the pressurizing roller 140 and on which a cam surface 212 is formed, and a swing member 230 that supports the shaft portion 139*a* of the heating roller 130.

Swing Member 230

The swing member 230 rotatably supports the shaft portion 139*a* of the heating roller 130, and extends in the apparatus width direction as seen in the apparatus depth direction. The shaft portion 139*a* is supported at the middle portion of the swing member 230 in the apparatus width direction.

A portion of the swing member 230 on one side (right side in the drawing) in the apparatus width direction is rotatably supported by a shaft member 240, the axial direction of which corresponds to the apparatus depth direction. Consequently, the swing member 230 is swingable about the shaft member 240. Meanwhile, a cam follower 232 is attached to a portion of the swing member 230 on the other side (left side in the drawing) in the apparatus width direction. The cam follower 232 is pressed against the cam surface 212 of the cam member 210 by a biasing member (not illustrated).

Cam Member 210

The cam member 210 is attached to the shaft member 148 of the pressurizing roller 140 so as to be rotated along with rotation of the shaft member 148. A projecting portion 212*a* that partially projects radially outward is formed on the cam surface 212 of the cam member 210. With the projecting portion 212*a* contacting the cam follower 232, the swing member 230 is swung, and the heating roller 130 is moved to a separated position at which the heating roller 130 is separated from the pressurizing roller 140.

When the projecting portion 212*a* does not contact the cam follower 232, the heating roller 130 is moved to a nip position at which the holding portion 160 (see FIG. 8) may be formed between the pressurizing roller 140 and the heating roller 130. The timing (time) of movement of the heating roller 130 between the separated position and the nip position will be discussed later.

In such a configuration, the heating roller 130 is rotated in a following manner by the pressurizing roller 140 which is rotated by a rotational force transmitted from a drive member (not illustrated). The pressurizing roller 140 which is rotated pressurizes the sheet member P clamped by the holding portion 160 toward the heating roller 130.

The timing when the heating roller 130 is moved by the contact/release mechanism 200 from the nip position to the separated position and the timing when the heating roller 130 is moved from the separated position to the nip position will be described below.

When the recessed portion 140*a* of the pressurizing roller 140 illustrated in FIG. 6 faces the heating roller 130, the holding portion 160 may not be formed between the pressurizing roller 140 and the heating roller 130, even if the heating roller 130 is disposed at the nip position. Therefore, the heating roller 130 which has been disposed at the nip position is moved to the separated position immediately before the recessed portion 140*a* of the pressurizing roller 140 which is rotated reaches a position at which the recessed portion 140*a* faces the heating roller 130. Specifically, the heating roller 130 which has been disposed at the nip position is moved to the separated position when the swing member 230 is swung with the cam follower 232 contacting the projecting portion 212*a*.

Further, the heating roller 130 which has been disposed at the separated position is moved to the nip position again when the recessed portion 140*a* substantially passes through a position at which the recessed portion 140*a* faces the heating roller 130 as the pressurizing roller 140 is rotated. The timing when the heating roller 130 is moved to the nip position again may be adjusted by the profile of the projecting portion 212*a* of the cam surface 212.

It is desired to secure as large a region in which the holding portion 160 is formed in the circumferential direction of the pressurizing roller 140, that is, a region in which the toner image may be fixed to the sheet member P, as possible when the heating roller 130 is moved to the nip position. Therefore, it is desirable that the heating roller 130 should be caused to abut against an edge portion (the start of a fall into a groove) of the recessed portion 140*a* when the heating roller 130 is moved to the nip position. When this repeatedly occurs, the heating roller 130 which is rotated repeatedly abuts against an edge portion (the start of a fall into a groove) of the recessed portion 140*a* of the pressurizing roller 140 when the heating roller 130 which has been at the separated position is moved to the nip position.

In the present exemplary embodiment, the pressurizing roller 140 does not include an elastic layer and, further, a portion of the elastic layer 134, which covers the entire circumference of the base material 132 of the heating roller 130, that abuts against an edge portion of the recessed portion 140*a* of the pressurizing roller 140 is not substantially constant, since the heating roller 130 is rotated.

[External Heating Rollers 150]

Figure 9:
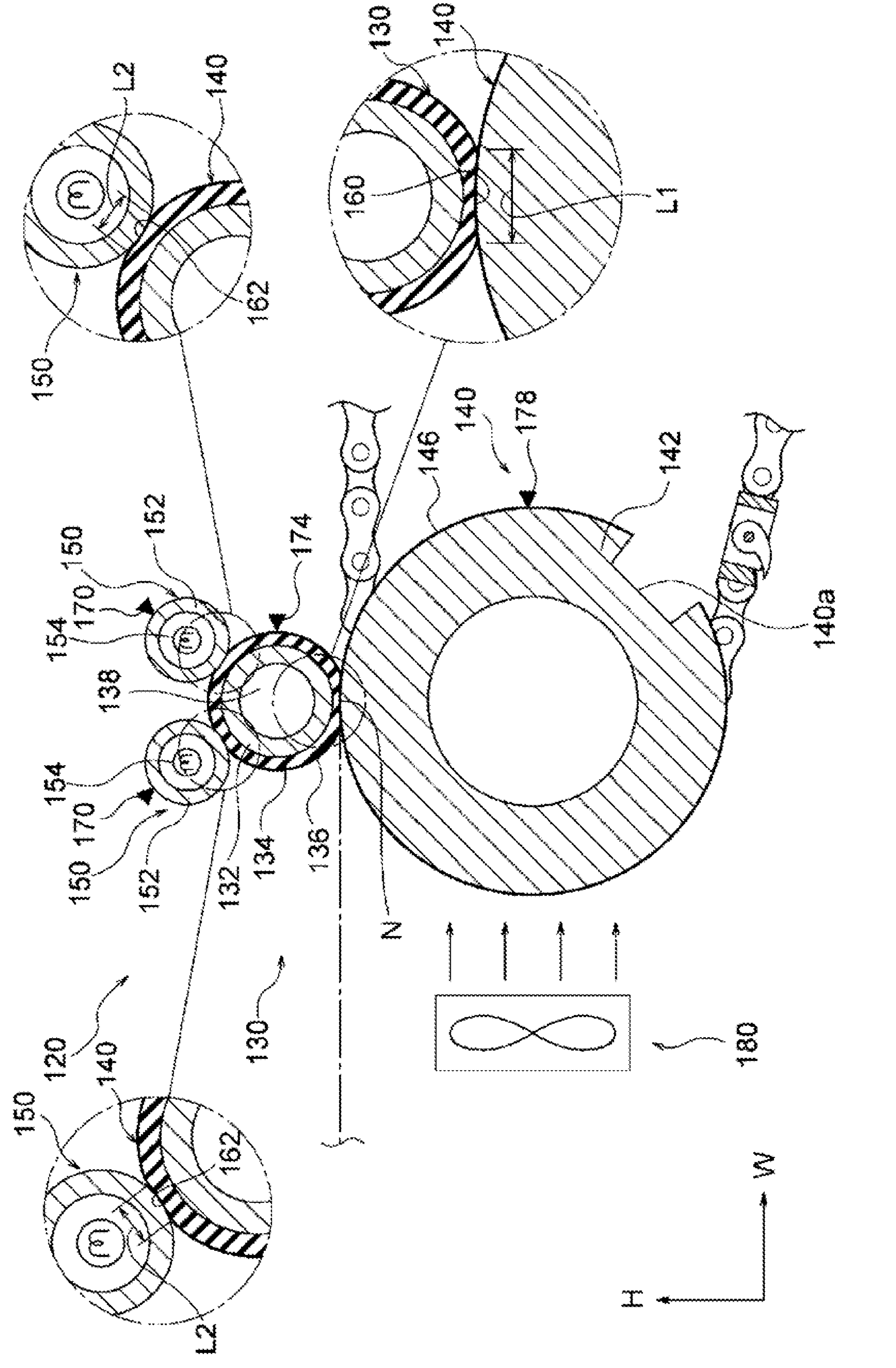
FIG. 9 is a sectional view illustrating the fixing unit etc. provided in the image forming apparatus according to the exemplary embodiment of the present disclosure.

A pair of external heating rollers 150 are provided, and disposed on opposite sides of the heating roller 130 from the pressurizing roller 140 as illustrated in FIGS. 8 and 9. In addition, the external heating rollers 150 extend in the apparatus depth direction with the axial direction of the external heating rollers 150 corresponding to the apparatus depth direction, and one of the external heating rollers 150 and the other external heating roller 150 are separated from each other in the circumferential direction of the heating roller 130.

The external heating rollers 150 each include a cylindrical base material 152 and a heater 154 stored inside the base material 152. The heater 154 is an example of the heating source.

The external heating rollers 150 are biased toward the heating roller 130 by a biasing member (not illustrated), and rotatably supported. Consequently, contact portions 162 are formed between the external heating rollers 150 and the heating roller 130 with the elastic layer 134 of the heating roller 130 deformed as illustrated in FIG. 8. The contact width at each of the contact portions 162 is defined as L2. The contact width L2 is the length of a portion at which the external heating roller 150 and the heating roller 130 contact each other as seen in the axial direction of the heating roller 130.

The sum (total) of the contact width L2 at the contact portion 162 between one of the external heating rollers 150 and the heating roller 130 and the contact width L2 at the contact portion 162 between the other external heating roller 150 and the heating roller 130 is equal to or more than the holding width L1 at the holding portion 160 which is formed by the pressurizing roller 140 and the heating roller 130.

From the viewpoint of facilitating control for the temperature of the outer peripheral surface of the heating roller 130, the total of the contact widths L2 is preferably equal to or more than the holding width L1, more preferably equal to or more than 1.3 times the holding width L1, and most preferably equal to or more than 1.6 times the holding width L1.

In such a configuration, the pair of external heating rollers 150 are rotated in a following manner by the heating roller 130, which is rotated, to heat the heating roller 130. The toner image is fixed to the sheet member P with the heating roller 130, which has been heated, and the pressurizing roller 140 transporting the sheet member P, to which the toner image has been transferred, with the sheet member P clamped by the holding portion 160.

[Others]

As illustrated in FIGS. 8 and 9, the fixing unit 120 includes a pair of temperature sensors 170 that detect the surface temperature of the pair of external heating rollers 150 and a temperature sensor 174 that detects the surface temperature of the heating roller 130. The temperature sensors may each be a non-contact sensor or a contact sensor, for example.

In such a configuration, the control section 96 brings the surface temperature of the heating roller 130 to a temperature of 180 [° C.] to 200 [° C.] determined in advance, for example, by acquiring the surface temperature of the heating roller 130 detected by the temperature sensor 174 and activating and inactivating the heaters 154 of the pair of external heating rollers 150.

The fixing unit 120 further includes a temperature sensor 178 that detects the surface temperature of the pressurizing roller 140, and a cooling fan 180 that cools the pressurizing roller 140. The temperature sensor 178 is an example of the detection section. The cooling fan 180 is an example of the cooling section.

As illustrated in FIG. 8, the cooling fan 180 is disposed downstream of the holding portion 160 in the rotational direction of the pressurizing roller 140 so as to apply air to the outer peripheral surface of the pressurizing roller 140 and the grip portion 68 with the grip portion 68 stored in the recessed portion 140*a*. Meanwhile, the temperature sensor 178 is disposed downstream of the cooling fan 180 and upstream of the holding portion 160 in the rotational direction of the pressurizing roller 140.

In such a configuration, the control section 96 brings the surface temperature of the pressurizing roller 140 to a temperature determined in advance, by acquiring the surface temperature of the pressurizing roller 140 detected by the temperature sensor 178 and activating and inactivating the cooling fan 180.

(Function of Principal Portion)

Next, the function of the principal portion will be described.

As illustrated in FIG. 9, the heating roller 130 is rotated in a following manner by the pressurizing roller 140 which is rotated by a rotational force transmitted from a drive member. In addition, a holding portion 160 that clamps the sheet member P being transported is formed through deformation of the elastic layer 134 of the heating roller 130 between the heating roller 130 and the pressurizing roller 140.

Further, the pair of external heating rollers 150 are rotated in a following manner by the heating roller 130 which is rotated. Contact portions 162 that transmit heat from the external heating rollers 150 to the heating roller 130 are formed between the pair of external heating rollers 150 and the heating roller 130 with the elastic layer 134 of the heating roller 130 deformed.

As illustrated in FIG. 7, the grip portion 68 which grips the distal end of the sheet member P to transport the sheet member P is stored in the recessed portion 140*a* formed in the pressurizing roller 140. Consequently, a part of the sheet member P is wound around the pressurizing roller 140.

Further, as illustrated in FIG. 8, when the pressurizing roller 140 is rotated and the grip portion 68 stored in the recessed portion 140*a* is moved along with movement of the recessed portion 140*a*, the grippers 76 (see FIG. 7) of the grip portion 68 stored in the recessed portion 140*a* are rotated by the action of a cam etc. (not illustrated). Consequently, grip on the distal end of the sheet member P by the grip portion 68 is released, and the sheet member P is transported toward the cooling section 90 (see FIG. 1) while being clamped by the holding portion 160. The fixing unit 120 fixes the toner image to the sheet member P by the heating roller 130 heating the sheet member P being transported while being clamped by the holding portion 160.

In addition, the cooling fan 180 cools the pressurizing roller 140 and the grip portion 68 by applying air to the outer peripheral surface of the pressurizing roller 140 and the grip portion 68 with the grip portion 68 stored in the recessed portion 140*a*.

CONCLUSION

In the fixing unit 120, as has been described above, the pressurizing roller 140 in which the recessed portion 140*a* is formed does not include an elastic layer. In the case where a pressurizing roller in which a recessed portion is formed includes an elastic layer, the elastic layer at an edge portion of the recessed portion repeatedly abuts against the heating roller which is rotated, and the elastic layer may be damaged at this portion. However, the elastic layer 134 which is provided to form the holding portion 160 between the heating roller 130 and the pressurizing roller 140 is formed on the heating roller 130, rather than on the pressurizing roller 140.

In the fixing unit 120, the heating roller 130 includes the elastic layer 134 over the entire circumference.

In the fixing unit 120, the heating roller 130 which heats the sheet member P includes the elastic layer 134.

The fixing unit 120 includes the cooling fan 180 which cools the pressurizing roller 140, and the temperature sensor 178 which detects the temperature of the outer peripheral surface of the pressurizing roller 140. The control section 96 controls the surface temperature of the pressurizing roller 140 by acquiring the surface temperature of the pressurizing roller 140 detected by the temperature sensor 178 and activating and inactivating the cooling fan 180.

In the fixing unit 120, the cooling fan 180 cools the pressurizing roller 140 and the grip portion 68 by applying air to the outer peripheral surface of the pressurizing roller 140 and the grip portion 68 with the grip portion 68 stored in the recessed portion 140*a*.

In the fixing unit 120, the holding portion 160 is formed through deformation of the elastic layer 134 between the pressurizing roller 140 and the heating roller 130. In addition, the contact portion 162 is formed through deformation of the elastic layer 134 between each of the pair of external heating rollers 150 and the heating roller 130. The sum (total) of the contact width L2 at the contact portion 162 between one of the external heating rollers 150 and the heating roller 130 and the contact width L2 at the contact portion 162 between the other external heating roller 150 and the heating roller 130 is equal to or more than the holding width L1 at the holding portion 160. By making the total of the contact widths L2 larger than the holding width L1 in this manner, the heating roller 130 is heated for a larger width than the width for which the heating roller 130 is deprived of heat at the holding portion 160.

In the fixing unit 120, the contact portion 162 with the contact width L2 is formed through deformation of the elastic layer 134 between each of the pair of external heating rollers 150 and the heating roller 130. That is, the total of the contact widths L2 is twice L2.

The image forming apparatus 10 includes the fixing unit 120.

While a specific exemplary embodiment of the present disclosure has been described in detail above, the present disclosure is not limited to such an exemplary embodiment. It is apparent to a person skilled in the art that a variety of other exemplary embodiments may fall within the scope of the present disclosure. For example, while the recessed portion 140*a* is formed in the pressurizing roller 140, the recessed portion 140*a* may be formed in a heating roller. In this case, the pressurizing roller includes an elastic layer, and the heating roller does not include an elastic layer.

While the elastic layer 134 is formed over the entire circumference of the heating roller 130 in the exemplary embodiment described above, one end and the other end of the elastic layer may be separated from each other. In this case, however, the effect obtained when the elastic layer 134 is formed over the entire circumference of the heating roller 130 is not obtained.

While the sheet member P is heated by the heating roller 130 which includes the elastic layer 134 in the exemplary embodiment described above, the sheet member P may be heated by the pressurizing roller which does not include an elastic layer. In this case, however, the effect obtained when the sheet member P is heated by the heating roller 130 which includes the elastic layer 134 is not obtained.

While the fixing unit 120 includes the cooling fan 180 which cools the pressurizing roller 140 and the temperature sensor 178 which detects the temperature of the outer peripheral surface of the pressurizing roller 140 in the exemplary embodiment described above, the fixing unit 120 may not include the cooling fan 180 and the temperature sensor 178. In this case, however, the effect obtained when the fixing unit 120 includes the cooling fan 180 and the temperature sensor 178 is not obtained.

While the cooling fan 180 applies air to the grip portion 68 in the exemplary embodiment described above, the cooling fan 180 may not apply air to the grip portion. In this case, however, the effect obtained when air is applied to the grip portion 68 is not obtained.

While the pressurizing roller 140 is cooled using the cooling fan 180 in the exemplary embodiment described above, the pressurizing roller may be cooled using a cooling pipe etc.

In the exemplary embodiment described above, the sum of the contact width L2 at the contact portion 162 between one of the external heating rollers 150 and the heating roller 130 and the contact width L2 at the contact portion 162 between the other external heating roller 150 and the heating roller 130 is equal to or more than the holding width L1 at the holding portion 160. In the case where there is one external heating roller, however, it is only necessary that the contact width of the one external heating roller should be equal to or more than the holding width.

In the exemplary embodiment described above, the sum of the contact width L2 at the contact portion 162 between one of the external heating rollers 150 and the heating roller 130 and the contact width L2 at the contact portion 162 between the other external heating roller 150 and the heating roller 130 is equal to or more than the holding width L1 at the holding portion 160. However, the sum of the contact width L2 and the contact width L2 may be less than the holding width L1. In this case, however, the effect obtained when the sum of the contact width L2 and the contact width L2 is equal to or more than the holding width L1 at the holding portion 160 is not obtained.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A fixing device comprising:

a first roller on which an elastic layer is formed; and a second roller, a groove extending in an axial direction being formed in an outer circumferential surface of the second roller, and the second roller not including an elastic layer, wherein the first roller and the second roller are arranged and configured so as to cooperatively apply pressure to a recording medium at a clamping portion between the first roller and the second roller and move the recording medium in a predetermined direction, and the groove is located on a portion of the second roller, the second roller applying the pressure to the recording medium and moving the recording medium as the second roller rotates, wherein the first roller and the second roller are arranged and configured such that a portion of the recording medium enters the groove when the first roller and the second roller rotate, and wherein the first roller and the second roller are arranged and configured to repeatedly cycle between separation and contact while the second roller is rotating.

2. The fixing device according to claim 1, wherein the elastic layer is formed over an entire circumference of the first roller.

3. The fixing device according to claim 2, wherein the first roller heats the recording medium which is clamped at the clamping portion, and the second roller receives heat transmitted from the first roller.

4. The fixing device according to claim 3, wherein the first roller which has been disposed at a contact position is moved to a separated position immediately before a recessed portion of the groove of the second roller which is rotated reaches a position at which the recessed portion of the groove faces the first roller, and wherein the first roller which has been disposed at the separated position is moved to the contact position when the recessed portion of the groove passes through the position at which the recessed portion the groove faces the first roller, as the second roller is rotated.

5. The fixing device according to claim 3, wherein a grip portion that grips a distal end of the recording medium and transports the recording medium is stored in the groove in a part of a region in a circumferential direction of the second roller.

6. The fixing device according to claim 5, wherein the first roller which has been disposed at a contact position is moved to a separated position immediately before a recessed portion of the groove of the second roller which is rotated reaches a position at which the recessed portion of the groove faces the first roller, and wherein the first roller which has been disposed at the separated position is moved to the contact position when the recessed portion of the groove passes through the position at which the recessed portion the groove faces the first roller, as the second roller is rotated.

7. The fixing device according to claim 2, wherein the first roller which has been disposed at a contact position is moved to a separated position immediately before a recessed portion of the groove of the second roller which is rotated reaches a position at which the recessed portion of the groove faces the first roller, and wherein the first roller which has been disposed at the separated position is moved to the contact position when the recessed portion of the groove passes through the position at which the recessed portion the groove faces the first roller, as the second roller is rotated.

8. The fixing device according to claim 1, wherein the first roller heats the recording medium which is clamped at the clamping portion, and the second roller receives heat transmitted from the first roller.

9. The fixing device according to claim 8, wherein a grip portion that grips a distal end of the recording medium and transports the recording medium is stored in the groove in a part of a region in a circumferential direction of the second roller.

10. The fixing device according to claim 9, wherein the first roller which has been disposed at a contact position is moved to a separated position immediately before a recessed portion of the groove of the second roller which is rotated reaches a position at which the recessed portion of the groove faces the first roller, and wherein the first roller which has been disposed at the separated position is moved to the contact position when the recessed portion of the groove passes through the position at which the recessed portion the groove faces the first roller, as the second roller is rotated.

11. The fixing device according to claim 8, wherein the first roller which has been disposed at a contact position is moved to a separated position immediately before a recessed portion of the groove of the second roller which is rotated reaches a position at which the recessed portion of the groove faces the first roller, and wherein the first roller which has been disposed at the separated position is moved to the contact position when the recessed portion of the groove passes through the position at which the recessed portion the groove faces the first roller, as the second roller is rotated.

12. An image forming apparatus comprising:

a transfer device that transfers an image to a recording medium; and the fixing device according to claim 1 which fixes the image which has been transferred to the recording medium.

13. The fixing device according to claim 1, wherein the first roller which has been disposed at a contact position is moved to a separated position immediately before a recessed portion of the groove of the second roller which is rotated reaches a position at which the recessed portion of the groove faces the first roller, and wherein the first roller which has been disposed at the separated position is moved to the contact position when the recessed portion of the groove passes through the position at which the recessed portion the groove faces the first roller, as the second roller is rotated.

* * * * *